(12) United States Patent
Madhurapantula et al.

(10) Patent No.: US 12,414,188 B2
(45) Date of Patent: Sep. 9, 2025

(54) METHOD AND USER EQUIPMENT FOR HANDLING PDCP DUPLICATION

(71) Applicant: SAMSUNG ELECTRONICS CO., LTD., Suwon-si (KR)

(72) Inventors: Shweta Madhurapantula, Bengaluru (IN); Gunjan Kumar Singh, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 320 days.

(21) Appl. No.: 18/154,120

(22) Filed: Jan. 13, 2023

(65) Prior Publication Data

US 2023/0171840 A1 Jun. 1, 2023

Related U.S. Application Data

(63) Continuation of application No. PCT/KR2022/018015, filed on Nov. 15, 2022.

(30) Foreign Application Priority Data

Nov. 16, 2021 (IN) .............................. 202141052464
Oct. 12, 2022 (IN) .............................. 2021 41052464

(51) Int. Cl.
*H04W 76/20* (2018.01)
*H04W 52/02* (2009.01)
*H04W 52/36* (2009.01)

(52) U.S. Cl.
CPC ....... *H04W 76/20* (2018.02); *H04W 52/0261* (2013.01); *H04W 52/365* (2013.01)

(58) Field of Classification Search
None
See application file for complete search history.

(56) References Cited

U.S. PATENT DOCUMENTS 11,172,537 B2 11/2021 Xiao et al.
11,483,896 B2 10/2022 Jin et al.
(Continued)

FOREIGN PATENT DOCUMENTS

EP 2 502 456 B1 8/2020
WO 2018/228134 A1 12/2018

OTHER PUBLICATIONS

Communications dated Feb. 21, 2023, issued by the International Searching Authority in counterpart International Application No. PCT/KR2022/018015 (PCT/ISA/210 and PCT/ISA/237).
(Continued)

*Primary Examiner* — Anh Vu H Ly
(74) *Attorney, Agent, or Firm* — Sughrue Mion, PLLC

(57) ABSTRACT

Embodiments herein provide a method performed by a user equipment (UE) for handling packet data convergence protocol (PDCP) duplication. In one embodiment, the method includes determining that a first criteria to deactivate the PDCP duplication is met based on a first device condition; and sending, to a base station, a first message indicating a first preference to deactivate the PDCP duplication. In other embodiment, the method also includes determining that a second criteria to activate the PDCP duplication is met based on a second device condition; and sending, to the base station, a second message indicating a second preference to activate the PDCP duplication.

12 Claims, 7 Drawing Sheets

(56) References Cited

U.S. PATENT DOCUMENTS

| | | | | |
|---|---|---|---|---|
| 2014/0329551 | A1* | 11/2014 | Ryoo | H04W 76/15 |
| | | | | 455/522 |
| 2015/0131461 | A1 | 5/2015 | Ramkumar et al. | |
| 2018/0279168 | A1 | 9/2018 | Jheng et al. | |
| 2019/0239279 | A1* | 8/2019 | Shi | H04W 80/02 |
| 2020/0092712 | A1 | 3/2020 | Zhao et al. | |
| 2020/0178331 | A1 | 6/2020 | Xu et al. | |
| 2020/0236734 | A1* | 7/2020 | Wei | H04W 80/02 |
| 2021/0112610 | A1* | 4/2021 | Xiao | H04L 1/1614 |
| 2021/0176349 | A1 | 6/2021 | Damnjanovic et al. | |
| 2021/0314883 | A1 | 10/2021 | Latheef | |
| 2023/0262802 | A1* | 8/2023 | Shi | H04W 76/15 |
| | | | | 370/328 |
| 2024/0147305 | A1* | 5/2024 | Zhang | H04W 28/06 |
| 2024/0357693 | A1* | 10/2024 | Zou | H04W 76/27 |

OTHER PUBLICATIONS

ZTE Corporation et al., "Discussion on UE based PDCP Duplication activation/deactivation," R2-2001460, 3GPP TSG RAN WG2 Meeting #108, Feb. 14, 2020, Total 3 pages.

Huawei et al., "Discussion about PDCP duplication activation/deactivation," R2-2001012, 3GPP TSG-RAN WG2 Meeting #109 electronic, Feb. 24-Mar. 6, 2020, Total 2 pages.

Samsung, "MAC Running CR for NR IIOT," R2-2001487, 3GPP TSG-RAN2 Meeting #109-e, Feb. 24-Mar. 6, 2020, Total 27 pages.

ZTE Corporation et al., "Discussion on UE based PDCP Duplication activation/deactivation", R2-2001460, 3GPP TSG RAN WG2 e-Meeting #108, Feb. 14, 2020, 3 total pages.

Huawei et al., "Discussion about PDCP duplication activation/deactivation", R2-2001012, 3GPP TSG-RAN WG2 Meeting #109 electronic, Feb. 14, 2020, 2 total pages.

Communication dated Dec. 16, 2024, issued by European Patent Office in European Patent Application No. 22896032.4.

"Discussion on UE based PDCP Duplication activation/deactivation", ZTE Corporation, 3GPP TSG RAN WG2 e-Meeting #108, Feb. 14, 2020, 3 pages.

Huawei et al., "Discussion about PDCP duplication activation/deactivation", Discussion and Decision, 3GPP TSG-RAN WG2 Meeting #109 electronic, Feb. 14, 2020, 2 pages.

"MAC running CR for NR IIOT", Samsung, 3GPP TSG-RAN2 Meeting #109-e, Feb. 14, 2020, 27 pages.

Communication issued Aug. 25, 2023 by the Indian Patent Office for IN Patent Application No. 202141052464.

* cited by examiner

METHOD AND USER EQUIPMENT FOR HANDLING PDCP DUPLICATION

CROSS-REFERENCE TO RELATED APPLICATIONS

This application is a by-pass continuation application of International Application No. PCT/KR2022/018015, filed on Nov. 15, 2022, which based on and claims priority to Indian Provisional Application Number 202141052464, filed on Nov. 16, 2021, and Indian Complete Application Number 202141052464, filed on Oct. 12, 2022, in the Indian Intellectual Property Office, the disclosures of which are incorporated by reference herein in their entireties.

BACKGROUND

Field

The present disclosure relates to an electronic device, and more specifically to a method and a user equipment (UE) for handling packet data convergence protocol (PDCP) duplication.

Description of Related Art

PDCP duplication is an enhanced feature of a new radio (NR) technology to improve data throughput and maintain service continuity. The PDCP duplication has a significant impact on improving average throughput with a downside of increase in power consumption. The PDCP duplication allows a PDCP entity to submit data such as protocol data unit (PDU) to two radio link control (RLC) entities, i.e., a primary node and a secondary node, which provide reliability with lower latency in communication by allowing data transfer to happen via two paths simultaneously, and at the same time simultaneous transferring data via two paths causes greater power consumption.

The PDCP duplication over uplink/downlink uses a split bearer to send the same packets over two bearers to provide high reliability and reduced latency. Though sending the same packets over the two bearers enhances an overall reliability, a power consumption of a UE increases due to processing of a doubled number of packets. Along with monitoring and processing for the downlink, the power consumption for the uplink also increases with the PDCP duplication due to sending the same packets on both legs (e.g. long-term evolution (LTE) leg and NR leg). A network entity (e.g., base station (BS)) entirely controls activation/deactivation of the PDCP duplication without taking the power levels or any other conditions at the UE into account.

There are a few scenarios where enabling duplication shall not provide expected results and further, raise the power consumption than in an ideal case. Consider a case where battery power of the UE is low now and the PDCP duplication had been enabled when the battery power was better. Further, data access would lead to quicker draining of the available battery power.

There is another case where duplication is active and majority of the packets processed by UE are declared invalid in one access indicating an issue with the radio link irrespective of the cause behind the issue with the radio link, leading to unnecessary power consumption in processing packets at UE and wastage of resources of the network for (re-) transmissions.

FIG. 1 illustrates signalling between the UE 10 and the base station 20 for the PDCP duplication, according to related art. Operations 11, 12, 13, 14 has to be performed between the UE 10 and the base station 20 for activation and continuation of the PDCP duplication. At operation 11, a split bearer is established for packet duplication between the UE 10 and the base station 20. At operation 12, base station 20 sends packets from both access/nodes to the UE 10. The UE 10 receives the packets on both legs (e.g. long-term evolution (LTE) leg and NR leg). At operation 13, the base station 20 sets poll bit in the packet sent to the UE 10 and starts a poll timer. At operation 14, the UE 10 has to send a status report to the access node that sets the poll bit. However, due to some reasons, the status report may be corrupted or may be not reached at the base station 20, which leads to retransmissions 16 of unacknowledged packets by the base station 20 after expiration of the poll timer 15. At operation 17, the UE 10 processes the packets again, which are simply discarded as duplicate, leading to more power consumption. This is one of the scenarios where PDCP duplication is not coherent. Thus, it may be desirable to provide a solution for handling the PDCP duplication.

SUMMARY

The principal object of the embodiments herein is to provide a method and a UE for handling PDCP duplication. Another object of the embodiments herein is to reduce consumption of a battery power at the UE caused primarily due to the PDCP duplication. If the PDCP duplication is initially active and the UE wants to deactivate the PDCP duplication later to conserve the battery power, then the UE indicates a preference to deactivate PDCP duplication to a base station at a given time, for example, using a radio resource control (RRC) based signaling or a medium access control (MAC) control element (CE).

Later, if the UE wants to activate the PDCP duplication again, the UE can indicate to the base station the UE's preference for activation of the PDCP duplication. Thus, the method allows the UE to save the battery power particularly in low battery scenarios, achieve prolonged battery life and longer service continuity of the UE. Also, the user will find it desirable to have the UE in power ON mode rather than power OFF mode.

Another object of the embodiments herein is to enhancements of power headroom reporting functionality for conserving battery power of the UE in duplication activated state. The UE uses the power headroom reporting functionality across one or both legs (e.g. long-term evolution (LTE) leg and NR leg) of the UE to reduce UL transmission. The leg selected can be based on the power consumed or based on the indication from AP to enable power save mode. The UE indicates reduced PHR by sending 0 or negative values on one or both legs of the PDCP duplication, so that the base station can schedule accordingly by modifying parameters like modulation and coding scheme (MCS), the base station can reduce physical resource block (PRB) usage or otherwise change scheduling pattern to use time-frequency resources that have low signal to interference plus noise ratio (SINR). Thus, the proposed methods help in preserving power at NR terminals as well as efficient utilization of radio resources.

According to an aspect of the disclosure, a method performed by a UE for handling PDCP duplication includes determining that a first criteria to deactivate the PDCP duplication is met based on a first device condition; and sending, to a base station, a first message indicating a first preference to deactivate the PDCP duplication.

The method further includes: determining that a second criteria to activate the PDCP duplication is met based on a second device condition; and sending, to the base station, a second message indicating a second preference to activate the PDCP duplication.

In the method, the first criteria to deactivate the PDCP duplication includes at least one of reception of invalid packets at the UE over a duplicated path, unnecessary retransmissions due to a corrupted status report of the UE, or a battery power of the UE.

In the method, the second criteria to activate the PDCP duplication includes at least one of reception of invalid packets at the UE over an active path, recovery of a battery power of the UE.

In the method, the first message is a medium access control (MAC) control element (CE) message and all data radio bearers (DRBs) of the MAC CE message are set to zero.

In the method, the first message is a medium access control (MAC) control element (CE) message and a single bit of the MAC CE indicates deactivation of the PDCP duplication to the base station.

In the method, the first message is a radio resource control (RRC) reconfiguration failure message.

In the method, the first message is an RRC configuration complete message.

In the method, the first message is UE assistance information with a field added under UE assistance information information element (IE) to indicate a reason for activating/deactivating the PDCP duplication.

In the method, the first message is UE assistance information with a reduced value of max transmit power limit (MTPL) or an independent information element (IE) in powSav-Parameters-r16 in UE-new radio (NR) capability.

In the method, the first message is a power headroom report (PHR) control element (CE) message with a negative or zero value based on a low battery power and/or activation of a power save mode.

According to another aspect of the disclosure, a UE for handling PDCP duplication includes: a memory; a processor; and a PDCP duplication preference indicator, coupled to the memory and the processor, configured for: determining that a first criteria to deactivate the PDCP duplication is met based on a first device condition, and sending a first message to a base station indicating a first preference to deactivate the PDCP duplication.

The PDCP duplication preference indicator is further configured for: determining that a second criteria to activate the PDCP duplication is met based on a second device condition; and sending a second message to the base station indicating a second preference to activate the PDCP duplication.

According to another aspect of the disclosure, a method performed by a base station communicating with a UE includes: sending, to the UE, a request for packet data convergence protocol (PDCP) duplication to be activated; receiving, from the UE, a medium access control (MAC) control element (CE) message indicating the UE's response; and deactivating the PDCP duplication based on the MAC CE message received from the UE.

In the method, deactivating the PDCP duplication based on the MAC CE message received from the UE includes deactivating the PDCP duplication based on the MAC CE message having all fields that are set to be zeros.

In the method, deactivating the PDCP duplication based on the MAC CE message received from the UE includes deactivating the PDCP duplication based on the MAC CE message having a single bit indicating the UE's response to deactivate the PDCP duplication.

According to another aspect of the disclosure, a method performed by a base station communicating with a UE includes: receiving, from the UE, a power headroom report (PHR) control element (CE) message indicating that the UE's transmission power level is lowered based on the UE's power that is lower than a threshold; and performing an action based on the received PHR CE message.

In the method, the action is to schedule uplink data on time-frequency resources that need less power.

In the method, the action is to reduce modulation and coding scheme (MCS), allocate less physical resource block (PRB), or reduce uplink transmission to the UE.

In the method, a transmit power control (TPC) via downlink control information (DCI) to indicate less uplink transmission power.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1:
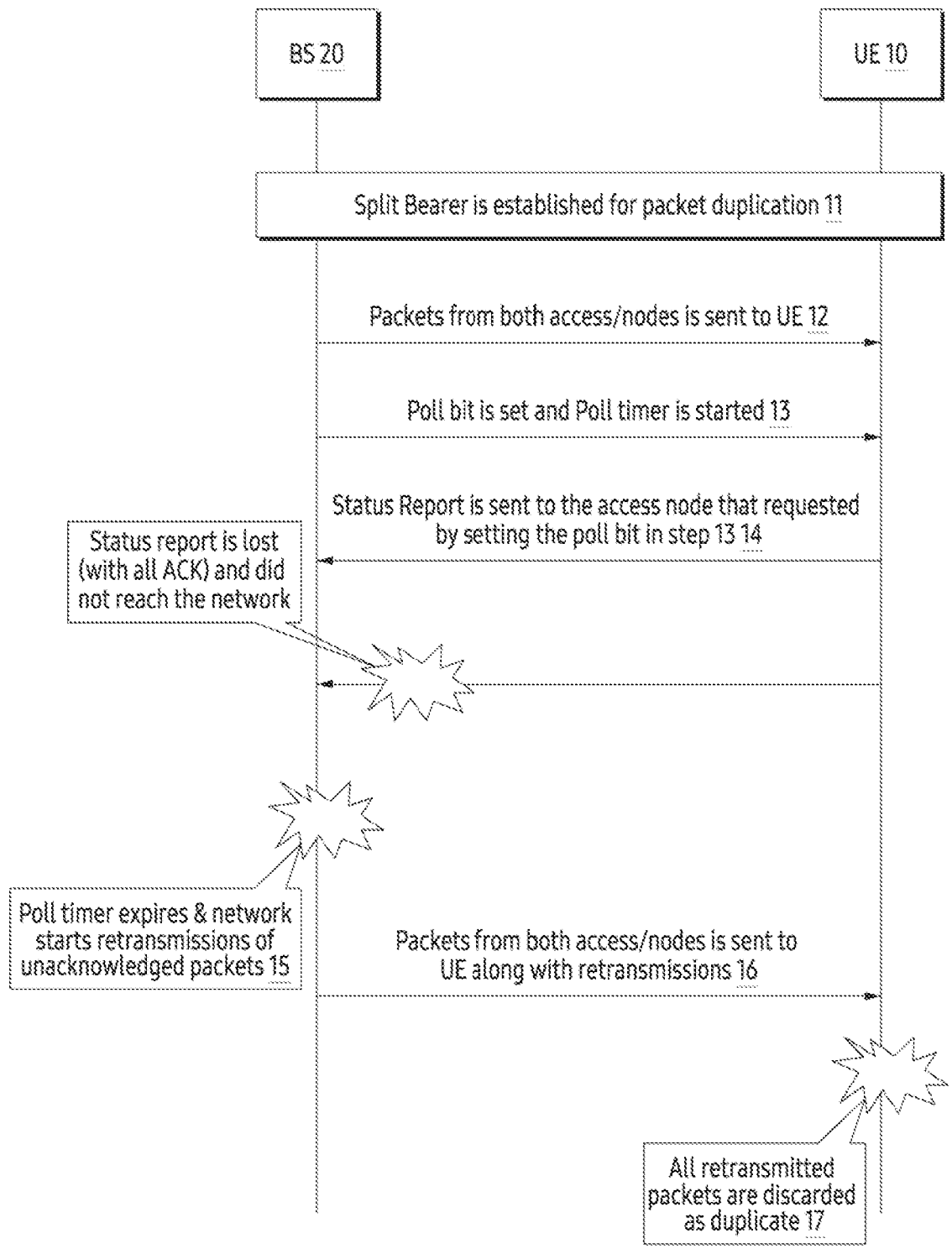
FIG. 1 illustrates signaling between a user equipment (UE) and a base station for packet data convergence protocol (PDCP) duplication, according to related art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

In existing new radio (NR) system, when packet data convergence protocol (PDCP) duplication is activated, then a UE has no direct control over the PDCP duplication. So if a battery power is low for the UE, then the UE is unable to indicate a preference for the PDCP duplication to a base station in the existing state. Also if UL PDCP duplication is activated, then the UE may want to save a UL transmission power but need not to disable the PDCP duplication completely as service continuity is important. The proposed methods in the present disclosure allow the UE to indicate the preference for the PDCP duplication using either a response to a RRC reconfiguration message, UE assistance information or a MAC CE. For saving transmission power, a new trigger condition is defined for PHR. Further, the UE can also indicate a reduced max transmit power limit (MTPL) using the UE assistance information.

Accordingly, the embodiments herein provide a method for handling the PDCP duplication by the UE. The method includes determining, by the UE, that a first criteria to deactivate the PDCP duplication is met based on a first device condition. Further, the method includes sending, by the UE, a first message to the base station indicating a first preference to deactivate the PDCP duplication.

Accordingly, the embodiments herein provide the UE for handling the PDCP duplication. The UE includes a PDCP duplication preference indicator, a memory, a processor, where the PDCP duplication preference indicator is connected to the memory and the processor. The PDCP duplication preference indicator is configured for determining that a criteria to activate/deactivate the PDCP duplication is met based on a device condition. Further, the PDCP duplication preference indicator is configured for sending a message to the base station indicating the preference to activate/deactivate the PDCP duplication.

Unlike existing methods and systems, the UE reduces consumption of the battery power at the UE caused primarily by the PDCP duplication. If the PDCP duplication is initially active and the UE wants to deactivate the PDCP duplication to conserve the battery power or under any other conditions, the UE indicates the preference for a PDCP duplication state (activate/deactivate) to the base station at a given time using a radio resource control (RRC) based signaling, the UE assistance information or a medium access control (MAC) control element (CE) based signaling. Later, if the UE wants to activate the PDCP duplication again, then the UE can indicate the preference to activate to the base station. Thus, the method allows the UE to save the battery power particularly in low battery scenarios, to improve resource utilization in lossy links, to achieve longer service continuity of the UE.

Unlike the existing methods and systems, the enhancements of power headroom reporting functionality of the proposed method helps to conserve the battery power of the UE. The UE uses the power headroom reporting functionality across one or both legs of the UE to reduce uplink (UL) transmission, which reduces power consumption even the PDCP duplication is enabled. The UE indicates reduced PHR by sending 0 or negative values on one or both legs of the PDCP duplication, so that the base station can schedule accordingly by modifying parameters like modulation and coding scheme (MCS), reducing Physical Resource Block (PRB) usage or otherwise changing scheduling pattern to use time-frequency resources that have low signal to interference & noise ratio (SINR). Thus, the proposed methods help in preserving power at NR terminals as well as efficient utilization of radio resources.

Referring now to the drawings, and more particularly to FIGS. 2 through 7, there are shown preferred embodiments.

Figure 2:
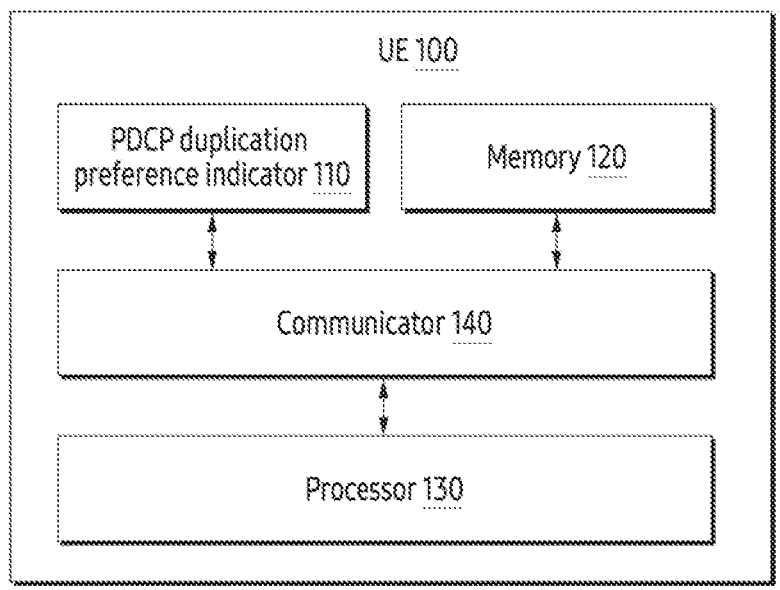
FIG. 2 is a block diagram of the UE for handling the PDCP duplication, according to an embodiment as disclosed herein.

FIG. 2 is a block diagram of a UE 100 for handling PDCP duplication, according to an embodiment as disclosed herein. Examples of the UE 100 include, but are not limited to a smartphone, a tablet computer, a Personal Digital Assistance (PDA), a laptop, an internet of things (IoT), a wearable device, etc. In an embodiment, the UE 100 includes a PDCP duplication preference indicator 110, a memory 120, a processor 130, and a communicator 140. The PDCP duplication preference indicator 110 is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The PDCP duplication preference indicator 110 determines that a first criteria to deactivate the PDCP duplication is met based on a first device condition. The first criteria to deactivate the PDCP duplication includes (i) reception of invalid packets at the UE 100 over a duplicated path, (ii) unnecessary retransmissions due to a corrupted status report of the UE 100, or (iii) low battery power of the UE 100. Further, the PDCP duplication preference indicator 110 sends to the base station 200 a first message indicating a first preference to deactivate the PDCP duplication. The base station 200 deactivates the PDCP duplication upon receiving the first message from the UE 100 with the preference to deactivate the PDCP duplication.

In an embodiment, the first message is a medium access control (MAC) control element (CE), where all data radio bearers (DRBs) of the existing Duplication/Activation MAC CE are set to zero or a single bit of a new MAC CE is used to indicate deactivation of the PDCP duplication to the base station 200. In another embodiment, the first message is a radio resource control (RRC) reconfiguration failure message with a new cause disablePDCPDuplication, when a secondary node addition comes with PDCP duplication activation case, for instance. In an embodiment, RRC signaling is based as a response to RRC reconfiguration or RRC setup from the base station 200 in which the PDCP duplication is being configured.

In another embodiment, the first message is an RRC configuration complete message with a new cause suspendPDCPDuplication. In another embodiment, the first message is UE assistance information with a new field added under the UE assistance information IE to indicate a reason for activating/deactivating the PDCP duplication. In another embodiment, the first message is UE assistance information with a reduced value of MTPL or an independent IE in powSav-Parameters-r16 in UE-NR capability in 38.331 technical specification. In another embodiment, the first message is a power headroom report control element (PHR CE) message with a negative or zero value based on a low battery power and/or activation of a power save mode.

In an embodiment, upon receiving the PHR CE message with the negative or zero value, the base station 200 schedules uplink data on time-frequency resources to the UE 100, based on the reported PHR CE message. In another embodiment, the base station 200 reduces PRB usage, MCS, or uplink transmission of the UE 100 based on the reported PHR CE message. In another embodiment, the base station 200 sends transmission power control (TPC) with a reduced value to the UE 100 based on the reported PHR CE message.

In an embodiment, the PDCP duplication preference indicator 110 determines that a second criteria to activate the PDCP duplication is met based on a second device condition. The second criteria to activate the PDCP duplication includes (i) reception of invalid packets at the UE 100 over an active path or (ii) recovery of the battery power of the UE 100. Further, the PDCP duplication preference indicator 110 sends a second message to the base station 200 indicating a second preference to activate the PDCP duplication. The base station 200 activates the PDCP duplication upon receiving the second message from the UE 100 with a second preference to activate the PDCP duplication.

In an embodiment, at any instance, the PDCP duplication preference indicator 110 dynamically indicates the base station 200 to enable or disable the PDCP duplication using the UE assistance information upon meeting the criteria. Optionally, the UE assistance information indicates a cause for enabling/disabling the PDCP duplication. In another embodiment, at any instance, the PDCP duplication preference indicator 110 sends the UE assistance information including a request to enable/disable the PDCP duplication by optionally including the reason for the request (e.g. activate, low battery, highRxInvalidPackets, etc.) devoid of timer dependency.

The addition of the new field to indicate the preference and reason for activating/deactivating the PDCP duplication in the UE assistance information IE (3GPP TS 38.331) is given below:

```
UEAssistanceInformation-v1610-IEs ::= SEQUENCE {
    ...
    referenceTimeInfoPreference-r16 BOOLEAN   OPTIONAL,
    pdcpDuplicationStatePreference-r16 ENUMERATED {activate,
 lowBattery, highRxInvalidPackets, both, spare} OPTIONAL,
    nonCriticalExtension SEQUENCE { }   OPTIONAL
}.
```

In another embodiment, the PDCP duplication preference indicator 110 sends a reduced/lower value of the MTPL as a part of the UE assistance information or independent information element (IE) in a powSav-Parameters-r16 in UE-NR capability, if a field is requested by the base station 200. The base station 200 uses this value as a reference for saving the power, unless the UE 100 sends the PHR CE message.

The memory 120 stores the device conditions, the preference to deactivate the PDCP duplication, and a level of battery power. The memory 120 stores instructions to be executed by the processor 130. The memory 120 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory 120 can be configured to store larger amounts of information than its storage space. In certain examples, a non-transitory storage medium may store data that can, over time, change (e.g., in Random Access Memory (RAM) or cache). The memory 120 can be an internal storage unit or it can be an external storage unit of the UE (100), a cloud storage, or any other type of external storage.

The processor 130 is configured to execute instructions stored in the memory 120. The processor 130 may be a general-purpose processor, such as a central processing unit (CPU), an application processor (AP), or the like, a graphics-only processing unit such as a graphics processing unit (GPU), a visual processing unit (VPU) and the like. The processor 130 may include multiple cores to execute the instructions. The communicator 140 is configured for communicating internally between hardware components in the UE 100.

Further, the communicator 140 is configured to facilitate the communication between the UE 100 and other devices via one or more networks (e.g. Radio technology). The communicator 140 includes an electronic circuit specific to a standard that enables wired or wireless communication.

Although the FIG. 2 shows the hardware components of the UE 100 but it is to be understood that other embodiments are not limited thereon. In other embodiments, the UE 100 may include less or a greater number of components. Further, the labels or names of the components are used only for illustrative purpose and does not limit the scope of the invention. One or more components can be combined together to perform same or substantially similar function for handling the PDCP duplication.

Figure 3:
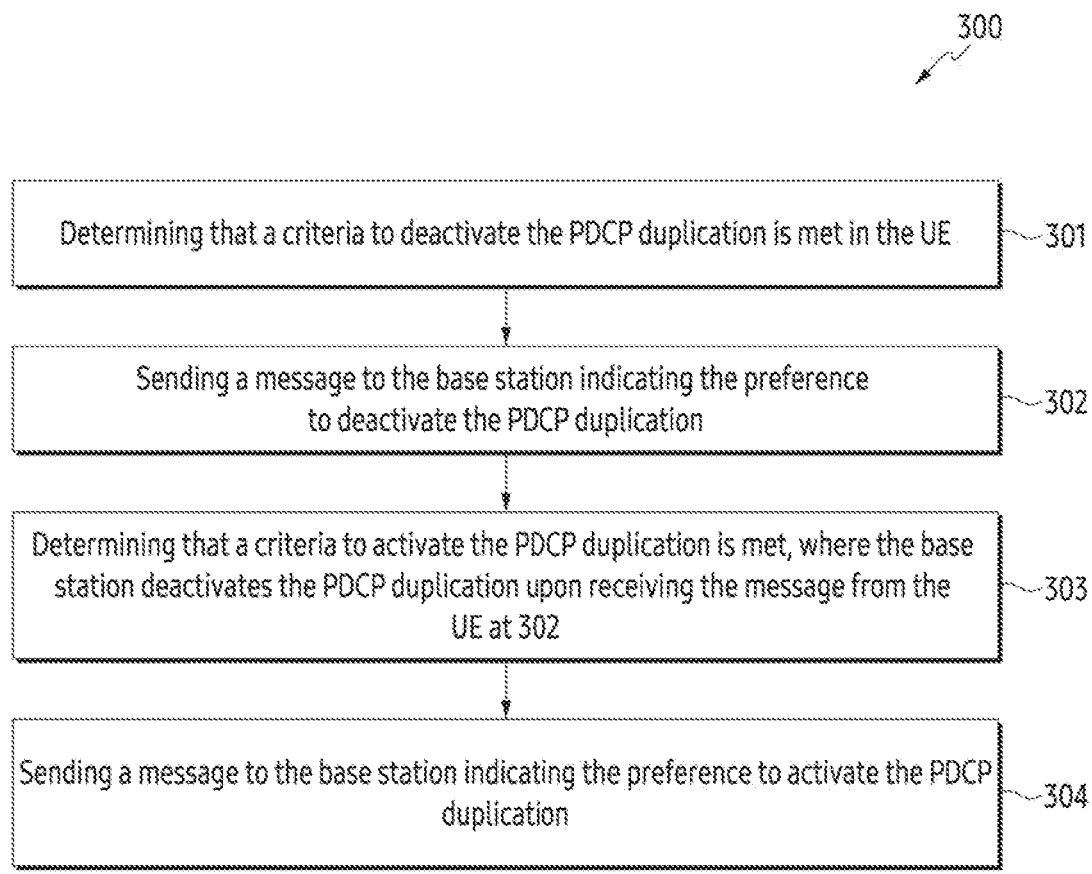
FIG. 3 illustrates a method for handling the PDCP duplication, according to an embodiment as disclosed herein.

FIG. 3 is a flow diagram 300 illustrating a method for handling the PDCP duplication, according to an embodiment as disclosed herein. In an embodiment, the method allows the PDCP duplication preference indicator 110 to perform operations 301-304 of the flow diagram 300. At operation 301, the method includes determining that a first criteria to deactivate the PDCP duplication is met in the UE 100. At operation 302, the method includes sending a first message to the base station 200 indicating a first preference to deactivate the PDCP duplication. At operation 303, the method includes determining that a second criteria to activate the PDCP duplication is met in the UE 100, where the base station 200 deactivates the PDCP duplication upon receiving the first message from the UE (100) at operation 302. At operation 304, the method includes sending the second message to the base station 200 indicating the preference to activate the PDCP duplication.

The various actions, acts, blocks, steps, operations, or the like in the flow diagram (300) may be performed in the order presented, in a different order, or simultaneously. Further, in some embodiments, some of the actions, acts, blocks, steps, operations, or the like may be omitted, added, modified, skipped, or the like without departing from the scope of the invention.

Figure 4:
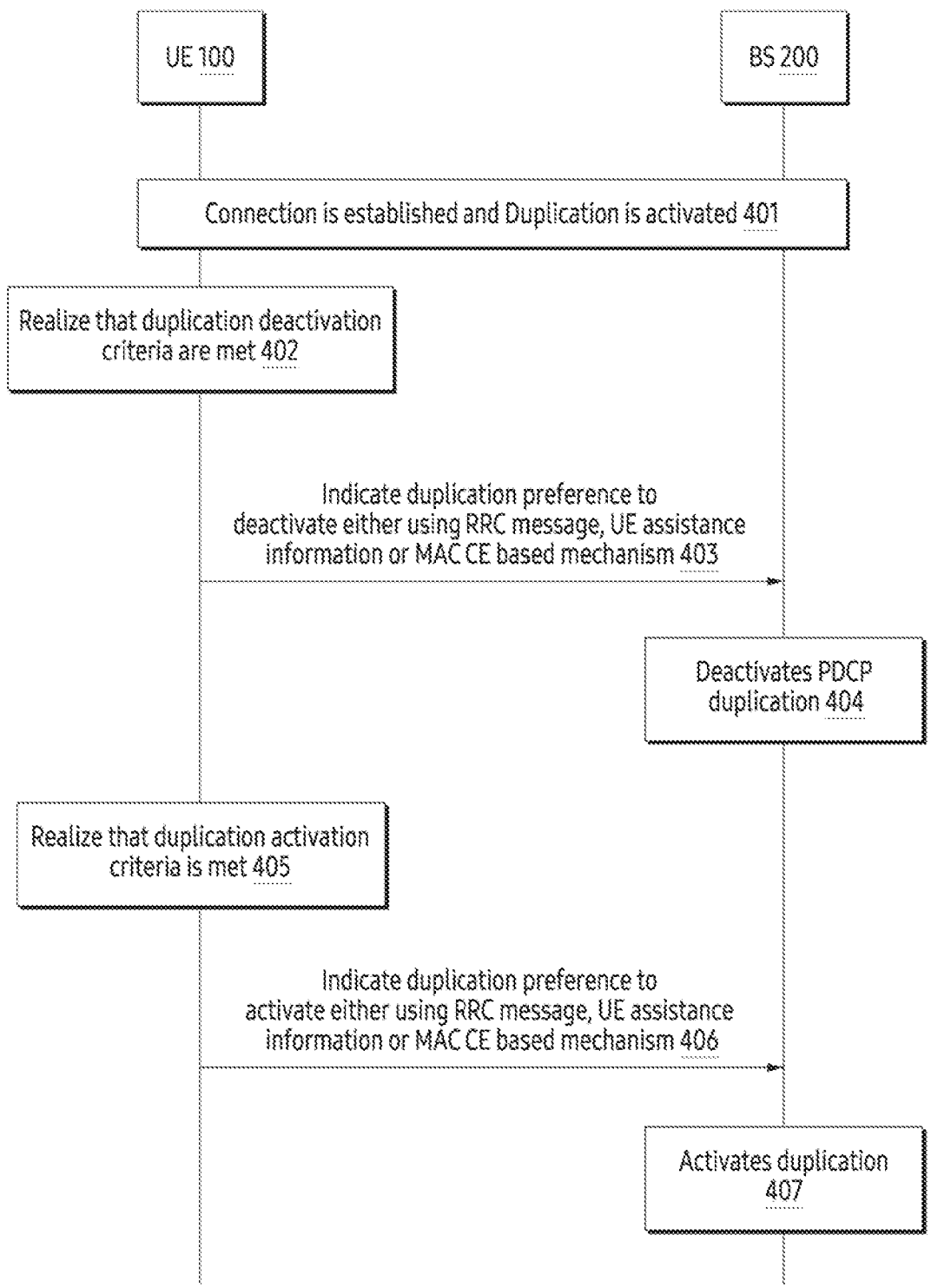
FIG. 4 illustrates signaling between the UE and the base station for enabling/disabling the PDCP duplication based on a preference of the UE, according to an embodiment as disclosed herein.

FIG. 4 illustrates signaling between the UE 100 and the base station 200 for enabling/disabling the PDCP duplication based on a preference of the UE, according to an embodiment as disclosed herein. At 401, the connection is established between the UE 100 and the base station 200) for the PDCP duplication. Further, the base station 200 activates the PDCP duplication. At 402, the UE 100 realizes or determines that a first criteria for deactivation of the PDCP duplication is met. At 403, the UE 100 indicates a first preference of the UE to the base station 200 using the RRC message, the UE assistance information or the MAC CE to deactivate the PDCP duplication. At 404, the base station 200 deactivates the PDCP duplication upon receiving the first preference to deactivate the PDCP duplication. Later, at 405, the UE (100) realizes or determines that a duplication activation criteria (a second criteria for activation of the PDCP duplication) is met. Further at 406, the UE 100) indicates a second preference of the UE 100 to the base station 200 using the RRC message, the UE assistance information or the MAC CE to activate the PDCP duplication. At 407, the base station 200 activates the PDCP duplication upon receiving the second preference to activate the PDCP duplication.

Figure 5:
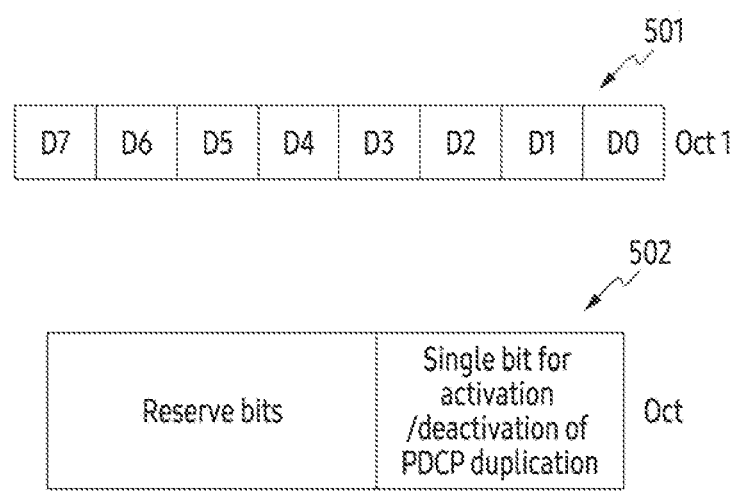
FIG. 5 illustrates a format of the medium access control (MAC) control element (CE) for providing the preference of the UE to the base station, according to an embodiment as disclosed herein.

FIG. 5 illustrates a format of the MAC CE for providing the preference of the UE to the base station, according to an embodiment as disclosed herein. The base station 200 sends the indication/request to the UE 100 for the PDCP duplication to be activated. If the UE 100 decides not to activate the PDCP duplication, then the UE 100 indicates the decision by sending a response or the MAC CE to the base station 200 when the PDCP duplication has to be deactivated. In an embodiment, the UE 100 reuses an existing PDCP duplication activation/deactivation MAC CE for requesting the deactivation of the PDCP duplication by setting all DRBs (D7-D0) of the CE as shown in 501. Upon finding all DRBs (D7-D0) of the CE as 0, the base station 200 deactivates the PDCP duplication. In another embodiment, the UE 100 uses a single bit of the MAC CE to indicate deactivation/activation of the PDCP duplication as shown in 502. Based on this single bit, the base station 200 dynamically activates/deactivates the PDCP duplication for all applicable radio bearers.

Figure 6:
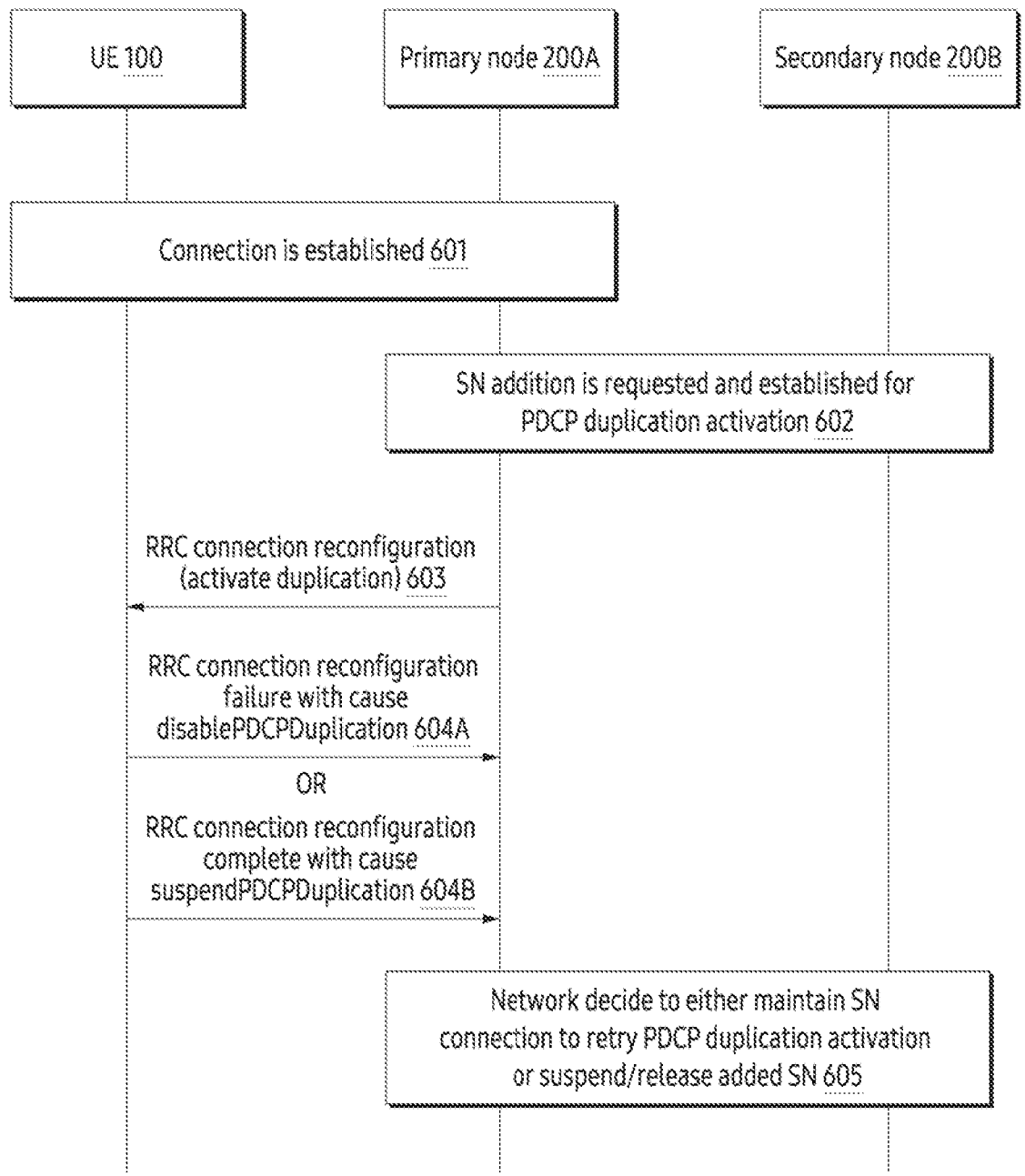
FIG. 6 illustrates radio resource control (RRC) based signaling between the UE, a primary node and a secondary node for disabling the PDCP duplication, according to an embodiment as disclosed herein.

FIG. 6 illustrates the RRC-based signaling between the UE 100, a primary node 200A, and a secondary node 200B for disabling the PDCP duplication, according to an embodiment as disclosed herein.

At 601, the connection is established between the UE 100 and the primary node 200A for the PDCP duplication. At 602, the primary node 200A adds the secondary node 200B for the PDCP duplication activation. At 603, when the UE 100 receives the PDCP duplication activation, for example, in the RRC connection reconfiguration or a resource block addition/modification procedure, then the UE 100 decides to reject the PDCP duplication activation by either sending RRC connection reconfiguration failure with a cause disablePDCPDuplication (604A) or RRC connection reconfiguration complete with a suspendPDCPDuplication (604B), which enables the UE 100 to avoid unnecessary control plane signaling for reconfiguration and remain connected with the network despite the low battery power.

At 605, the primary node 200A decides whether to maintain connection with the secondary node 200B to retry the PDCP duplication activation or suspend/release connection with the secondary node 200B. The UE 100 sends the RRC connection reconfiguration failure when addition of the secondary node 200B comes with the PDCP duplication activation case, for instance. The UE 100 sends the RRC connection reconfiguration complete when for other similar cases and applied in normal case (irrespective of power).

Figure 7:
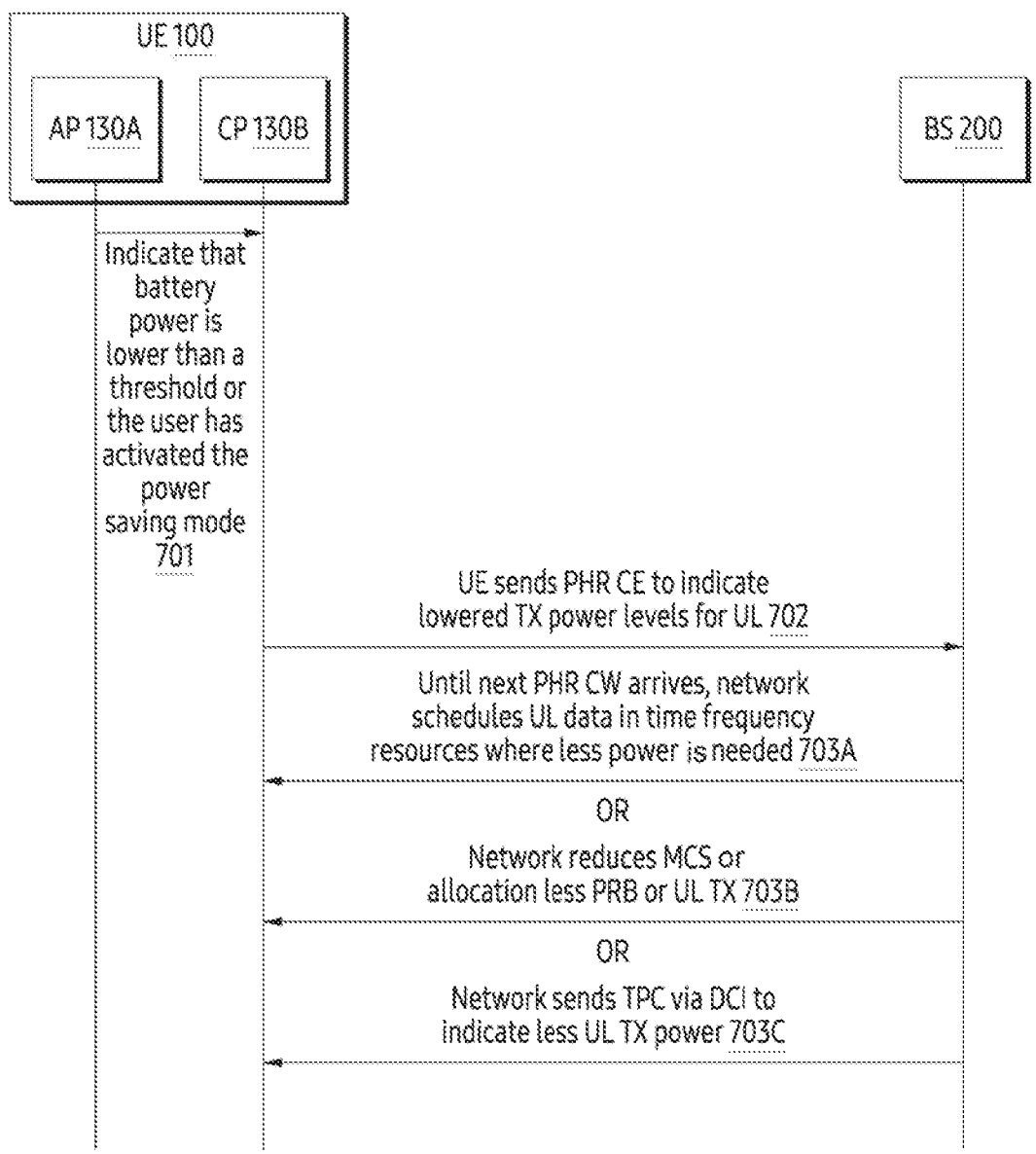
FIG. 7 illustrates signaling between the UE and the base station for scheduling deactivation of the PDCP duplication based on power headroom reporting or revise either scheduling, resources used or reduce the UL Tx power, according to an embodiment as disclosed herein.

FIG. 7 illustrates signaling between the UE 100 and the base station 200 for scheduling deactivation of the PDCP duplication based on power r headroom reporting or revise either scheduling, resources used or reduce the UL Tx power, according to an embodiment as disclosed herein. Consider, an application processor (AP) 130A of the UE 100 indicates that the battery power is lower than a threshold or the user has activated a power saving mode to a cellular processor (CP) 130B of the UE 100 at 701. That is, the UE 100 determines that its battery power is lower than a threshold. The UE 100 shall send a PHR CE to indicate lowered Tx power levels to the network (e.g., the base station 200). Further, the base station 200 performs operation 703A, operation 703B, or operation 703C.

At operation 703A, the base station 200 schedules uplink data in time-frequency resources to the UE 100) where the low battery power is needed until the next PHR codeword (CW) message arrives. At operation 703B, the base station 200 reduces MCS or allocates less PRB or reduce the uplink transmission. At operation 703C, the base station 200 transmits, to the UE 100, a transmit power control (TPC) via downlink control information (DCI) to indicate less uplink transmission power.

According to embodiments, a method performed by a user equipment (UE) for handling packet data convergence protocol (PDCP) duplication, the method comprises determining that a first criteria to deactivate the PDCP duplication is met based on a first device condition; and sending, to a base station, a first message indicating a first preference to deactivate the PDCP duplication.

In some embodiments, the method further comprises determining that a second criteria to activate the PDCP duplication is met based on a second device condition, and sending, to the base station, a second message indicating a second preference to activate the PDCP duplication.

In some embodiments, the first criteria to deactivate the PDCP duplication comprises at least one of reception of invalid packets at the UE over a duplicated path, unnecessary retransmissions due to a corrupted status report of the UE, or a battery power of the UE.

In some embodiments, the second criteria to activate the PDCP duplication comprises at least one of reception of invalid packets at the UE over an active path, recovery of a battery power of the UE.

In some embodiments, the first message is a medium access control (MAC) control element (CE) message. All Data Radio Bearers (DRBs) of the MAC CE message are set to zero.

In some embodiments, the first message is a Medium Access Control (MAC) Control Element (CE) message. A single bit of the MAC CE indicates deactivation of the PDCP duplication to the base station.

In some embodiments, the first message is a Radio Resource Control (RRC) reconfiguration failure message.

In some embodiments, the first message is a Radio Resource Control (RRC) configuration complete message.

In some embodiments, the first message is UE assistance information with a field added under UE assistance information Information Element (IE) to indicate a reason for activating/deactivating the PDCP duplication.

In some embodiments, the first message is UE assistance information with a reduced value of Max Transmit Power Limit (MTPL) or an independent Information Element (IE) in powSav-Parameters-r16 in UE-New Radio (NR) capability.

In some embodiments, the first message is a Power Headroom (PHR) Control Element (CE) message with a negative or zero value based on a low battery power and/or activation of a power save mode.

In some embodiments, the method comprises performing, by the base station (200), based on the reported PHR CE message, one of scheduling uplink data on time-frequency resources to the UE (100), reducing PRB usage or MCS or uplink transmission of the UE (100), and sending Transmission Power Control (TPC) with a reduced value to the UE (100).

According to embodiments, a user equipment (UE) for handling packet data convergence protocol (PDCP) duplication, comprises a memory; a processor; and a PDCP duplication preference indicator, coupled to the memory and the processor, configured for determining that a first criteria to deactivate the PDCP duplication is met based on a first device condition, and sending a first message to a base station indicating a first preference to deactivate the PDCP duplication.

In some embodiments, the PDCP duplication preference indicator is further configured for determining that a second criteria to activate the PDCP duplication is met based on a second device condition, and sending a second message to the base station indicating a second preference to activate the PDCP duplication.

According to embodiments, a method performed by a base station communicating with a user equipment (UE), comprises sending, to the UE, a request for packet data convergence protocol (PDCP) duplication to be activated, receiving, from the UE, a medium access control (MAC) control element (CE) message indicating the UE's response, and deactivating the PDCP duplication based on the MAC CE message received from the UE.

In some embodiments, deactivating the PDCP duplication based on the MAC CE message received from the UE comprises deactivating the PDCP duplication based on the MAC CE message having all fields that are set to be zeros.

In some embodiments, deactivating the PDCP duplication based on the MAC CE message received from the UE comprises deactivating the PDCP duplication based on the MAC CE message having a single bit indicating the UE's response to deactivate the PDCP duplication.

According to embodiments, a method performed by a base station communicating with a user equipment (UE), comprises receiving, from the UE, a power headroom report (PHR) control element (CE) message indicating that the UE's transmission power level is lowered based on the UE's power that is lower than a threshold, and performing an action based on the received PHR CE message.

In some embodiments, the action is to schedule uplink data on time-frequency resources that need less power.

In some embodiments, the action is to reduce modulation and coding scheme (MCS), allocate less physical resource block (PRB), or reduce uplink transmission to the UE.

In some embodiments, the action is to transmit, to the UE, a transmit power control (TPC) via downlink control information (DCI) to indicate less uplink transmission power.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method performed by a user equipment (UE) for handling a packet data convergence protocol (PDCP) duplication, the method comprising:
   receiving, from a base station, a first message for activating the PDCP duplication;
   determining whether a first criterion related to invalid packets for the PDCP duplication is met;
   in accordance with a determination that the first criterion is met, transmitting, to the base station, first UE assistance information indicating a preference for a deactivation of the PDCP duplication; and
   receiving, from the base station, a second message for deactivating the PDCP duplication.

2. The method of claim 1, further comprising:
   determining whether a second criterion related to the invalid packets for the PDCP duplication is met; and
   in accordance with a determination that the second criterion is met, transmitting, to the base station, second UE assistance information indicating a second preference for an activation of the PDCP duplication.

3. The method of claim 1, wherein the first criterion related to the invalid packets for the PDCP duplication corresponds to a reception of the invalid packets over a duplicated path for the PDCP duplication, and
   wherein the invalid packets are determined as invalid after being processed by the UE.

4. The method of claim 2, wherein the second criterion related to the PDCP duplication corresponds to a reception of the invalid packets over an active path for the PDCP duplication.

5. The method of claim 1, wherein the first UE assistance information indicates a reason for deactivating the PDCP duplication.

6. The method of claim 1, wherein the first UE assistance information includes a reduced value of max transmit power limit (MTPL) or an independent information element (IE) in powSav-Parameters-r16 in UE-new radio (NR) capability.

7. A user equipment (UE) for handling a packet data convergence protocol (PDCP) duplication, comprising:
a memory storing instructions; and
a processor including processing circuitry,
wherein the instructions executed by the processor cause the UE to:
receive, from a base station, a first message for activating the PDCP duplication;
determine whether a first criterion related to invalid packets for the PDCP duplication is met;
in accordance with a determination that the first criterion is met, transmitting, to the base station, first UE assistance information indicating a preference for a deactivation of the PDCP duplication; and
receive, from the base station, a second message for deactivating the PDCP duplication.

8. The UE of claim 7, wherein the instructions executed by the processor further cause the UE to:
determine whether a second criterion related to the invalid packets for the PDCP duplication is met; and
in accordance with a determination that the second criterion is met, transmitting, to the base station, second UE assistance information indicating a second preference for an activation of the PDCP duplication.

9. The UE of claim 7, wherein the first criterion related to the invalid packets for the PDCP duplication corresponds to a reception of the invalid packets over a duplicated path for the PDCP duplication, and
wherein the invalid packets are determined as invalid after being processed by the UE.

10. The UE of claim 8, wherein the second criterion related to the PDCP duplication corresponds to a reception of the invalid packets over an active path for the PDCP duplication.

11. The UE of claim 7, wherein the first UE assistance information indicates a reason for deactivating the PDCP duplication.

12. The UE of claim 7, wherein the first UE assistance information includes a reduced value of max transmit power limit (MTPL) or an independent information element (IE) in powSav-Parameters-r16 in UE-new radio (NR) capability.

* * * * *